US006937730B1

(12) United States Patent
Buxton (10) Patent No.: US 6,937,730 B1
(45) Date of Patent: Aug. 30, 2005

(54) METHOD AND SYSTEM FOR PROVIDING CONTENT-SPECIFIC CONDITIONAL ACCESS TO DIGITAL CONTENT

(75) Inventor: Mark J. Buxton, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/505,211

(22) Filed: Feb. 16, 2000

(51) Int. Cl.$^7$ .............................................. H04N 7/167
(52) U.S. Cl. ...................................... 380/241; 380/239
(58) Field of Search ... 348/1–3; 380/20–250; 455/2–7; 713/165

(56) References Cited

U.S. PATENT DOCUMENTS

| | | | | |
|---|---|---|---|---|
| 5,495,576 | A * | 2/1996 | Ritchey ...................... | 345/420 |
| 5,757,417 | A * | 5/1998 | Aras et al. .................... | 725/14 |
| 5,872,588 | A * | 2/1999 | Aras et al. .................... | 725/14 |
| 6,216,228 | B1 * | 4/2001 | Chapman et al. ........... | 713/176 |
| 6,240,555 | B1 * | 5/2001 | Shoff et al. ................. | 725/110 |
| 6,351,596 | B1 * | 2/2002 | Ostrover ...................... | 386/46 |
| 6,373,948 | B1 * | 4/2002 | Wool .......................... | 380/241 |
| 6,684,240 | B1 * | 1/2004 | Goddard ..................... | 709/217 |

* cited by examiner

Primary Examiner—Gregory A. Morse
Assistant Examiner—Ellen C Tran
(74) Attorney, Agent, or Firm—Steven P. Skabrat (57) ABSTRACT

Content level filtering or masking of digital content that is broadcast, multicast, or otherwise distributed to receivers in a communications system. Instead of controlling the content only at the location of the broadcaster or at the receiver, the present invention provides the capability to control access to the content, and manipulate the content itself via a masking operation, at any point in the content distribution hierarchy or transmission chain. The present invention provides enhanced customer choice to different versions of the content and content creator control over content deemed to be too objectionable or too sensitive to be transmitted without partial concealment or obfuscation. A mask may be specified to change the content distributed further down the distribution hierarchy. The mask may be a distorted or opaque two dimensional (2D) region (for video content), or a replacement audio segment (for audio content), or a distorted or opaque three dimensional (3D) volume (for 3D content), carried separately from the original content in digital multimedia broadcast, multicast, or point-to-point distribution systems. The present invention also specifies the co-transmission to a receiver of encrypted, masked content, which may be used to "undo" a masking or obfuscation operation previously performed anywhere upstream of the receiver in the distribution channel.

12 Claims, 9 Drawing Sheets

METHOD AND SYSTEM FOR PROVIDING CONTENT-SPECIFIC CONDITIONAL ACCESS TO DIGITAL CONTENT

BACKGROUND

1. Field

The present invention relates generally to content distribution systems and, more specifically, to controlling access to selected portions of transmitted digital content.

2. Description

Many different broadcast systems exist which provide analog content to users. For example, radio and television programs are transmitted to consumers via traditional over-the-air broadcast methods, satellites, and cable systems. In most systems, the regulation or censorship of the content is performed by the broadcaster, often in conformance with governmental requirements, and the receiver displays whatever signal is received. In some systems, modification of the content may be performed at the end-user's site. For example, a cable system may transmit a scrambled signal to a receiver, which then decodes the signal if the receiver is authorized to do so. This authorization may occur, for example, if the end-user pays for the programming service or if the end-user enters a passcode to the receiver.

When the content to be broadcast is represented digitally, new opportunities and new problems arise. Digital content may now be broadcast or multicast over broadband channels to many users, perhaps over wide area networks such as the Internet. However, if digital content is transmitted to end-users without adequate security mechanisms in place, piracy of the content may become widespread. Furthermore, if the content is represented and transmitted in digital form, it may be possible to manipulate the content for groups of receivers, or even for individual receivers. However, mechanisms to control the delivery of the content to consumers based on the content itself do not currently exist. What is needed is a way of providing secure conditional access to broadcast digital content based on the content itself, the characteristics of the end-users, and the transmission channels used.

BRIEF DESCRIPTION OF THE DRAWINGS

The features and advantages of the present invention will become apparent from the following detailed description of the present invention in which.

DETAILED DESCRIPTION

An embodiment of the present invention is a system and method for providing content level filtering or masking of digital content that is broadcast, multicast, or otherwise distributed to receivers in a communications system. Instead of controlling the content only at the location of the broadcaster or at the receiver, the present invention provides the capability to control access to the content, and manipulate the content itself via a masking operation, at any point in the content distribution hierarchy or transmission chain. In one embodiment, the present invention provides enhanced customer choice to different versions of the content and content creator control over content deemed to be too objectionable or too sensitive to be broadcast without partial concealment or obfuscation.

Embodiments of the present invention specify the use of a mask to change the content distributed to a receiver. The mask may be a distorted or opaque two dimensional (2D) region (for video content), or a replacement audio segment (for audio content), or a distorted or opaque three dimensional (3D) volume (for 3D content), carried separately from the original content in digital multimedia broadcast, multicast, or point-to-point distribution systems. The present invention also specifies the co-transmission to a receiver of encrypted, masked content, which may be used to "undo" a masking or obfuscation operation previously performed anywhere upstream of the receiver in the distribution channel. The present invention provides for controlled, revocable access by an end-user to the content according to the policies of the content creator, owner or distributor. In one embodiment, this control mechanism may be used to protect selected audiences from being able to render objectionable content and to grant certain customers or distributors control over the level of masking or obfuscation performed on the content prior to rendering or further transmission. In another embodiment, the content may be masked to obfuscate sensitive data within the content. For example, private financial data or trade secret data may be masked for some audiences but not others.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

The content distribution system of the present invention comprises at least several components. These components include digital content, digital obfuscation masks, digital masked content, transmission systems and channels, local distributors, and customer receiver systems. These components include features that enhance the artistic freedom of content creators, protect regulatory and parental interests in restricting selected content to certain audiences, and provide freedom to an unrestricted audience to view content as intended by the content creator. These features include the digital representation of content, masks, and masked content; the co-transmission of masks with original content or masked content; linking of masks or masked content to original content; in-transit masking of original content;

encryption of masked content; audience-driven control of the level of masking; and user authentication.

Figure 1:
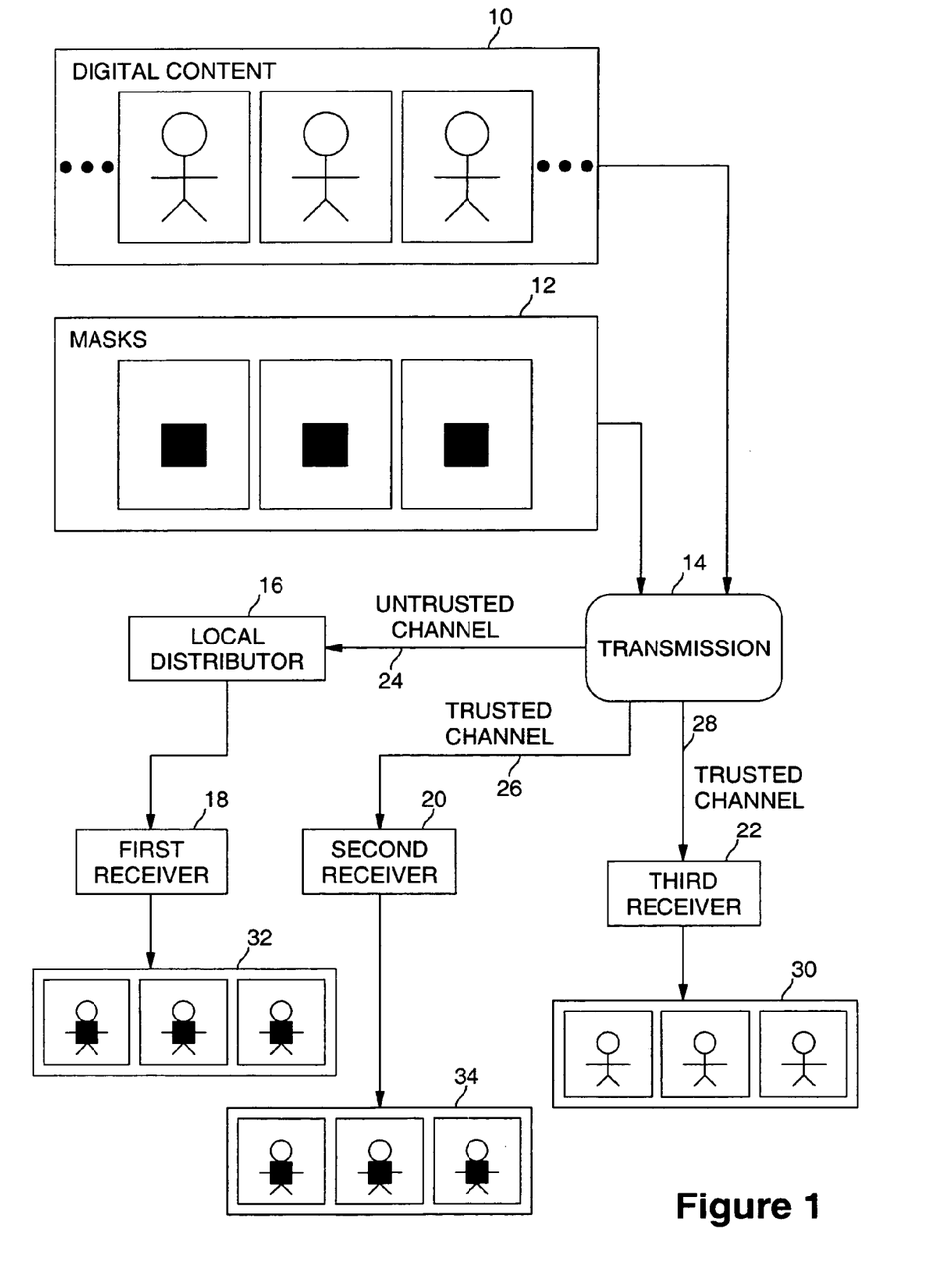
FIG. 1 is a high level diagram illustrating the concept of providing content-specific conditional access according to an embodiment of the present invention.

FIG. 1 is a high level diagram illustrating the concept of providing content-specific conditional access according to an embodiment of the present invention. Any multimedia content may be represented as digital content 10. The content may be any audio, video, text, image, or other data intended to be rendered by a device for a customer, consumer or end-user to see, hear, or otherwise perceive and consume the content. The content may comprise a single image, audio sample, or frame of video, or may comprise a stream of images, samples, frames, or other data. The content in digital form may be reconstructed by a user's receiving device into one or more sets of pixels (for image and video), one or more samples, clips, or tracks (for audio), one or more volumes/voxels (for 3D images), or any other form which can be manipulated digitally to obscure or obfuscate selected portions of the original content. Content may be rendered in either an original form or in an obfuscated form.

Figure 2:
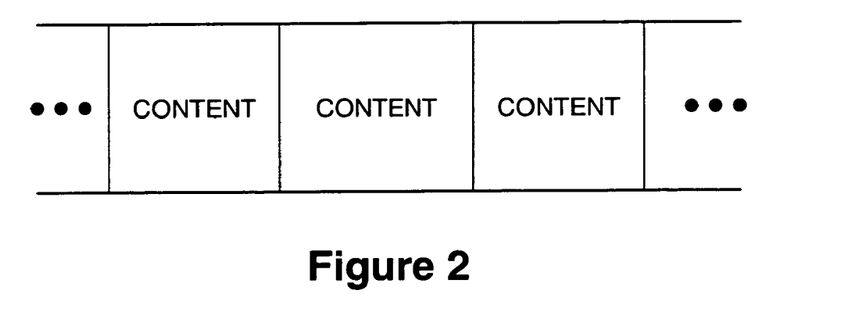
FIGS. 2–5 are diagrams illustrating modes of digital content distribution according to an embodiment of the present invention.
Figure 3:
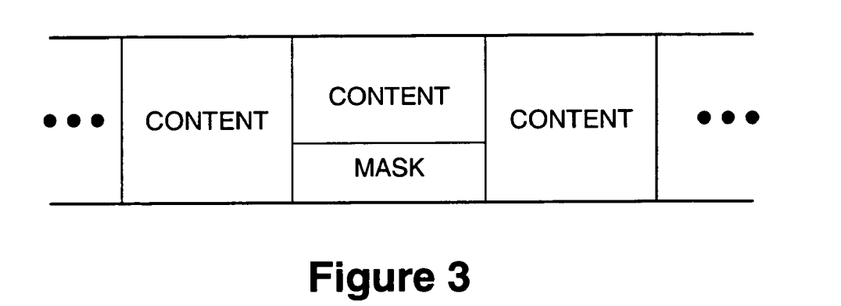
Figure 4:
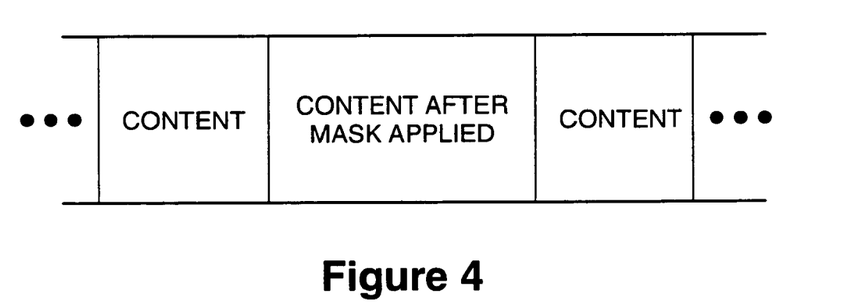
Figure 5:
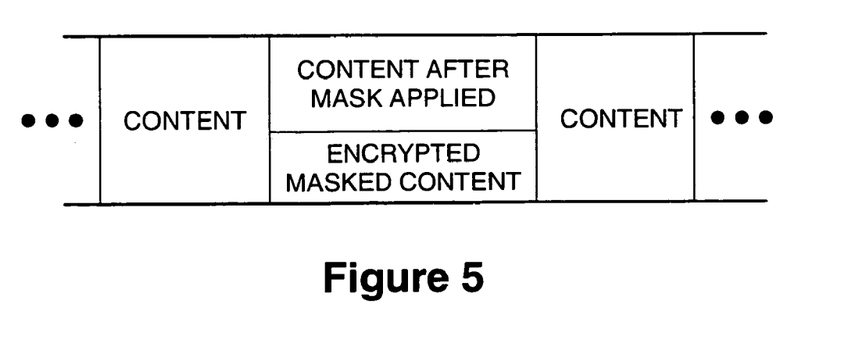

Generally, digital content may be transmitted in three different formats. First, the content may be transmitted "in the clear", that is, in unedited and unmasked form as originally authored. FIG. 2 shows content transmitted "in the clear", without any masking being applied to it. In FIG. 2, the content is shown as being distributed in a continuing stream of data portions or packets. A variation on this format is shown in FIG. 3, where the content is transmitted unobfuscated and a mask is sent along with the original content, thereby allowing any element in a distribution hierarchy to apply the mask to the content to obfuscate selected portions of the content according to the specifications of the mask. Second, the content may be transmitted with a mask already applied to it to generate "content after mask applied" (CAMA) data. This modified content may have had objectionable or sensitive data or information masked so that the objectionable or sensitive data or information cannot be perceived by the end-user. FIG. 4 shows content after the mask has been applied as a selected portion of a content stream. Third, the content may be transmitted in "content after mask applied" (CAMA) format, but the transmission of data may also include the masked content after encryption has been performed. FIG. 5 shows a portion of content after the mask has been applied along with the encrypted masked content in a transmission stream. The encryption may be performed using any suitable cryptographic process. This may prevent unauthorized receivers from reconstructing the original content. By using encryption, the content transmitted through open channels to existing, untrustworthy receivers may still be protected.

Returning to FIG. 1, digital content 10 is represented symbolically as a sequence of frames of video, but it should be understood that this is for representative purposes and is not meant to limit the scope of the invention in any way.

One or more masks 12 may be applied to digital content 10 at any point in a content distribution hierarchy to partially or wholly obfuscate or conceal selected portions of the content. A mask provides a fine-granularity determination of what portion of the content should be obfuscated and what portion should be left "in the clear." A mask comprises a digital representation of the region to be obfuscated in the final rendering process perceivable by the end-user. The mask may be created by the content creator or by a third party after the original content is created. For 2D images or video data, for example, the mask may comprise either a set of pixels which are to be obscured or a piecewise closed curve which bounds the obscured region. For video data, one of these masks may be supplied for each frame in a selected video sequence. In one embodiment, the region may be specified by a starting frame number, an ending frame number, a 2D mask region, and an origin of the mask region. For audio data, the mask may comprise a starting time, an ending time, and a replacement sample or sound. For 3D data, the mask may comprise the volume region to be obscured, and may be represented as a collection of volume elements or an enclosing volume primitive. In all cases, the mask may contain additional creative replacement components, such as a bird noise in place of an audible profanity, clothing on a naked person in a video frame, alternative renderings of a 3D model, or a high-level summary of sensitive information instead of the full details, for example. A characteristic feature of the mask is the region represented and the resulting fact that some underlying content is obfuscated so that a particular end-user cannot perceive it. In other embodiments, other mask strategies may be employed.

The mask may be applied at any point in the chain of distribution of the content. The mask may be transmitted at or about the same time as the original content, or may be transmitted before or after the content. Co-transmission, however, enables fast mask application processing and reduces the effectiveness of security attacks seeking to remove the mask from the content. If the mask is applied to the original content by the content creator or content owner (e.g., an artist, movie studio, record company, television production company, computer game author, etc.), the masked content may also be transmitted separately. It should be understood that for any original content, multiple versions of the content may be prepared and distributed using multiple masks. In some embodiments, both the mask and the masked content may be transmitted when the mask is applied to the original content at or near the beginning of the content distribution chain.

The digital content and the masks may be linked together. A link may be specified from the mask to the content (or vice versa) which defines a simple association (e.g., one mask is applied to one frame of video) or more complex associations may be specified. Other links include a duration of a masking operation (in time or samples of time), physical or temporal location in units of the original image (e.g., pixels) at which the mask is to be applied, and mask restrictiveness, ranked against a scale predetermined by a ratings system (e.g., "R", "PG-13", "NC-17", etc.) or as a function of other factors such as time of day and audience type.

Masks may be applied by a content creator, a distributor, within the distribution system (by a reseller, for example), or at the receiver. Transmission of the content and the mask includes information which maintains the mask creator's intent as to how the mask is to be applied to the content. Once the mask is applied, it may be undone by reversing the masking operation given appropriate additional information (such as the encrypted masked content and the mask) if the current holder of the content is authorized to do so.

Depending on the content distribution mode, digital content, masks, "content after mask applied" (CAMA) data, and encrypted masked content may be transmitted substantially concurrently across a distribution channel to arrive at an end-user's receiver to be rendered. Content and masks may be transferred via transmission 14 to other distributors, such as local distributor 16 and then on to first receiver 18, or directly to second and third receivers 20 and 22. Distribution takes place across one of two types of channels. The first type is an untrusted channel. When using an untrusted channel, the mask is first applied to the original content to obscure or obfuscate the content. The CAMA data is then transmitted without the mask (as shown in FIG. 4). Such channels may be used whenever the identity or suitability of a customer or end-user to the content cannot be verified or authenticated. The second type of channel is a trusted channel, represented in FIG. 1 by reference numerals 26 and 28. When using a trusted channel, both the digital content and the mask may be transmitted unmodified (as shown in FIG. 3). In this case, the masking may be performed by a receiver, if necessary or desired depending on receiver characteristics, prior to rendering the content. Although only one transmission component and one local distributor are shown in FIG. 1, the transmission channels may be tiered or layered in a hierarchy of any number of levels, with distribution components at each tier determining whether sub-channels are trusted or not and obfuscating content accordingly.

Receivers form the final destination of content among the components of the system. Receivers 18, 20, and 22, receive and render the digital content, either original content or obfuscated content. Rendering may comprise displaying text, images, and video, and generating audio signals. A receiver may comprise a digital television, a set-top box, a personal computer (PC), a satellite receiver, a personal digital assistant (PDA), or other device for receiving and rendering multimedia signals. Trusted receivers may perform masking operations locally, while untrusted receivers may require content to be masked upstream in the distribution hierarchy and prior to reception. User authentication may be employed to obtain the correct identification of a target audience or end-user at a receiver's location. For example, a pass code or personal identification number (PIN) may need to be entered into the receiver in order to have the receiver render original content, or to select an appropriate level of masking. Other user authentication techniques may also be used.

With the present invention, the audience (determined individually, via other members of an audience such as parents or corporate management, or via third parties such as governmental regulatory groups) can influence or control the selection or absence of masks by directly influencing the application of masks at each stage of the distribution hierarchy. As shown in FIG. 1, for some receivers, the resulting rendered content may be without obfuscation 30, but for other receivers, the rendered content may be with obfuscation 32, 34.

At each stage of the content authoring and distribution system of the present invention, system entities decide how to transmit the content. An entity may transmit the original content only, transmit the original content and associated mask for future application of the mask, apply the mask to the content and transmit the CAMA data only, or apply the mask to the content and transmit the encrypted masked content separately from the CAMA data, so that a downstream entity may reverse the masking operation if authorized to do so.

Figure 6:
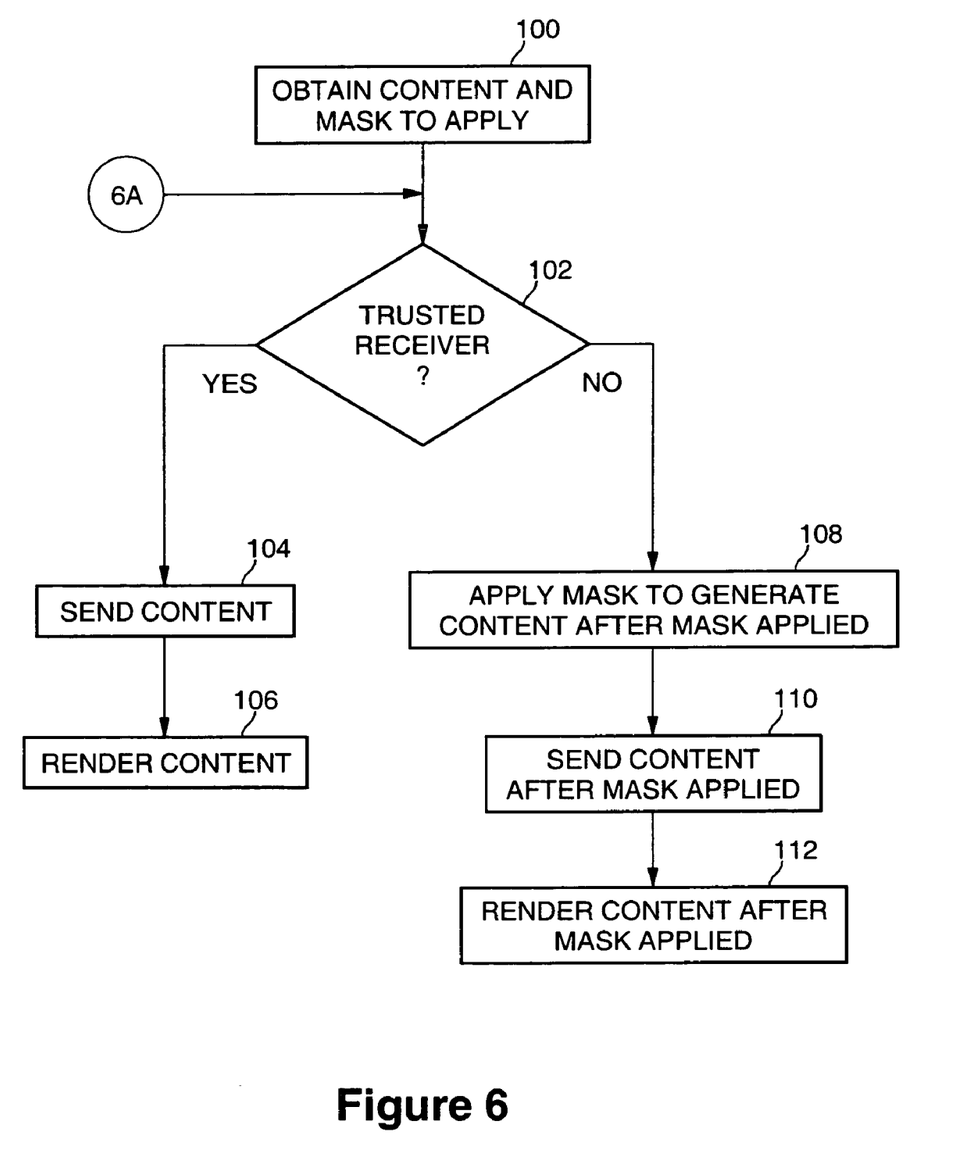
FIG. 6 is a diagram of a first distribution model according to an embodiment of the present invention.

In embodiments of the present invention, there are at least two models of distributing content. FIG. 6 is a diagram of a first distribution model according to an embodiment of the present invention. In the first model, the distribution channel for the content is assumed to be trusted. At block 100, a component in the distribution hierarchy (e.g., a broadcaster, broadcasting network, cable head end, local distributor, local station) obtains the content and the mask to apply to the content from an authorized source. The authorized source may be the original content creator or a production company, for example. At block 102, it may be determined if the receiver is trusted. This may be accomplished by any one of several methods known in the art of authentication. If the receiver is trusted, then the original, unmodified content may be sent over a communications channel at block 104 to a receiver. At block 106, the receiver then renders the content for perception by a user. If it cannot be verified that the receiver is trusted, then the component applies the mask to generate "content after mask applied" (CAMA) data at block 108. The CAMA data is then sent over a communications channel to a receiver at block 110. At block 112, the receiver renders the CAMA data for perception by a user. The user perceives modified or edited content instead of the original content.

Figure 7:
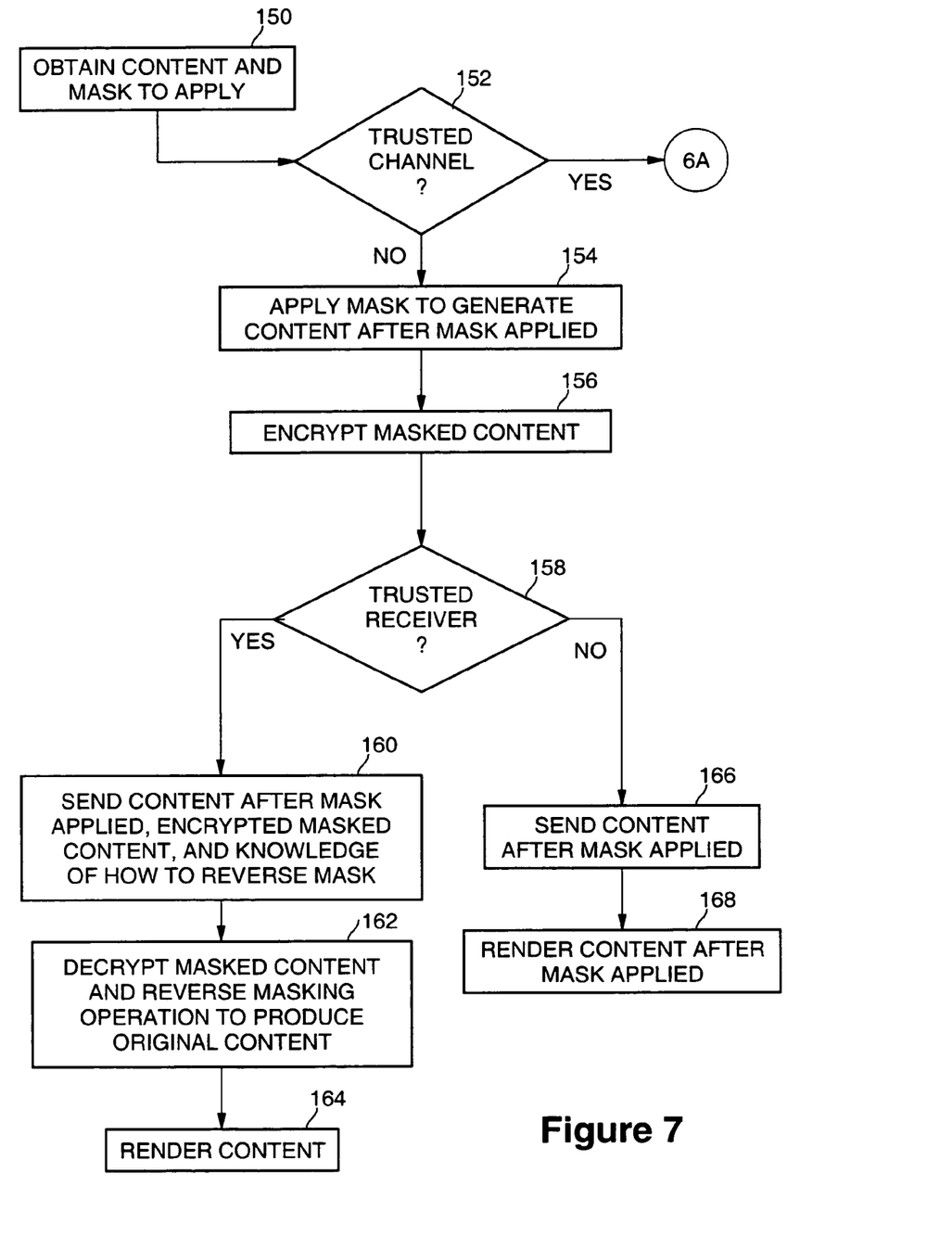
FIG. 7 is a diagram of a second distribution model according to an embodiment of the present invention.

FIG. 7 is a diagram of a second distribution model according to an embodiment of the present invention. In the second model, it may not be known if the distribution channel for the content is trusted. At block 150, a component in the distribution hierarchy (e.g., a broadcaster, broadcasting network, cable head end, local distributor, local station) obtains the content and the mask to apply to the content from an authorized source. The authorized source may be the original content creator or a production company, for example. At block 152, it may be determined if the channel is trusted. If the channel is trusted, processing may continue according to the first distribution model as shown in FIG. 6 via connector 6A. If the channel is not trusted, block 154 is performed by the component to apply a mask to generate CAMA data. At block 156, the masked content may be encrypted to protect it from unauthorized access. The masked content is that portion of the content that has been obscured, obfuscated or concealed.

At block 158, it may be determined if the receiver is trusted. If the receiver is trusted, then block 160 is performed. At block 160, the CAMA data, the encrypted masked content, and optionally knowledge of how to reverse the masking operation may be sent on the distribution channel to the trusted receiver. At block 162, the trusted receiver decrypts the masked content and reverses the masking operation to produce the original content. At block 164, the newly regained original content may be rendered by the trusted receiver for perception by the user. If the receiver is not trusted, then the CAMA data may be transmitted to the "untrusted" receiver at block 166. At block 168, this content may be rendered by the receiver for perception by a user.

Figure 8:
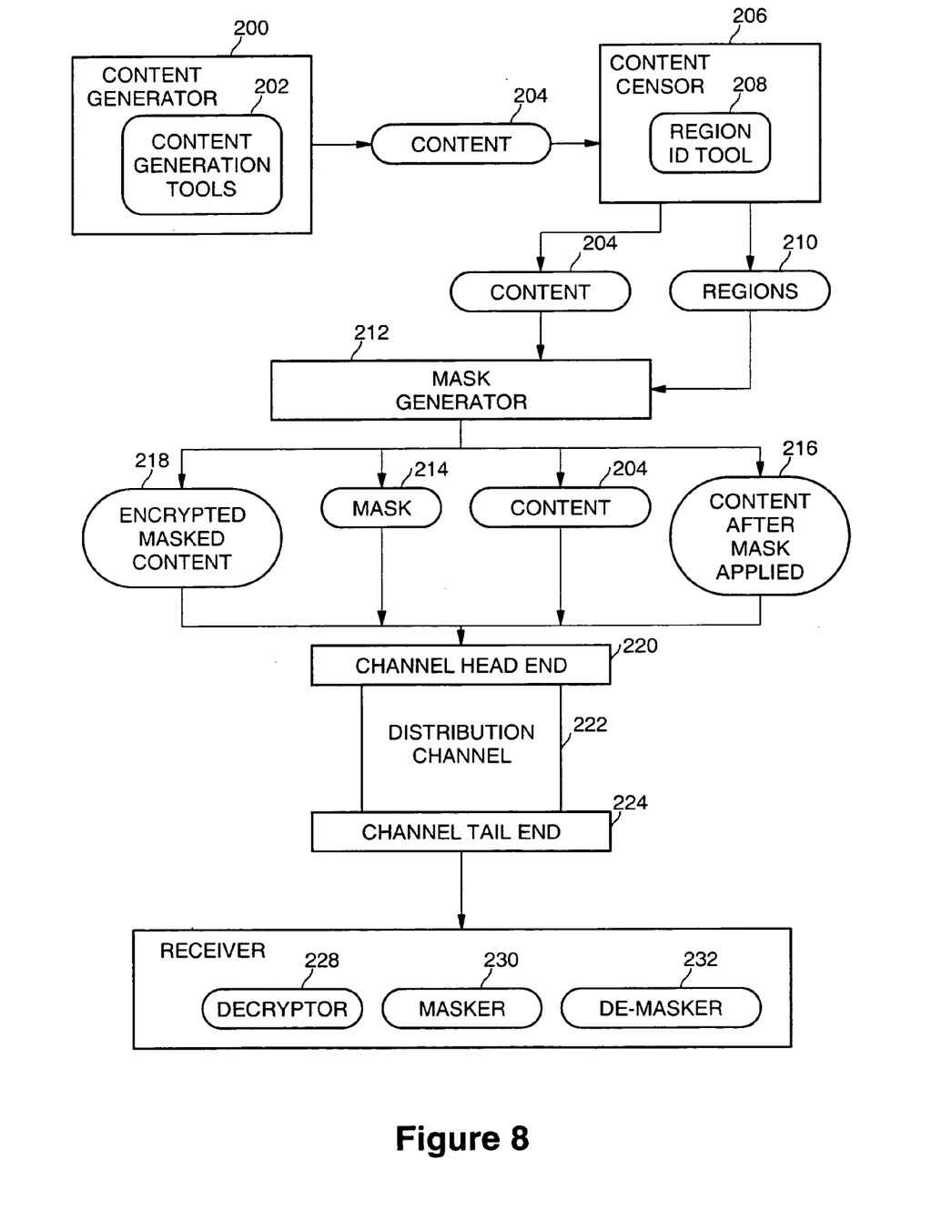
FIG. 8 is a diagram of a content distribution system according to an embodiment of the present invention.

FIG. 8 is a diagram of a content distribution system according to an embodiment of the present invention. Content generator 200 may be an entity that creates content using content generation tools 202. The content generation tools may be any means or device for creating content, such as a personal computer (PC), an analog or digital video camera, or a sound recording device, for example. Content 204 created by the content generator may be communicated to content censor 206. Content censor may be an entity that identifies regions of the content to mask. In some embodiments, the content censor and the content generator may be the same entity. The content censor uses a region identification (ID) tool 208 to identify regions of the content to mask. A region may be, for example, a group of pixels in one or more video frames, an audio clip, a three dimensional volume, and so on. Generally, a region is any portion of the content that is to be obfuscated, concealed, or masked. The region ID tool examines the content and, through content censor interaction, specifies portions of the content to be masked.

The content 204 and regions 210 may be communicated to a mask generator 212. The mask generator accepts the content and the regions and produces a mask to apply to the content in order to obfuscate or otherwise conceal the identified regions within the content. The mask generator may be operated by the content censor, the content generator, or a distributor. The mask generator links the content with the regions, generates masks, applies the mask to the content to produce CAMA data, and encrypts the masked content after application of the mask. Data output from the mask generator includes original content 204, a mask 214, CAMA data 216, and encrypted masked content 218.

One or more of these data sets may be communicated by a distributor in a content distribution hierarchy. The data may be input to a channel head end 220, transmitted via distribution channel 222, and received by channel tail end 224. At the lowest level of the content distribution hierarchy, one or more receivers 226 receives the data. Depending on whether the channel and the receiver are trusted or authorized, the current operating characteristics of the receiver, and the data received by the receiver over the distribution channel, the receiver may use a decryptor tool 228 to decrypt the encrypted masked content, a masker tool 230 to apply a mask to content to produce CAMA data, or a de-masker tool 232 to reverse the masking operation to recover the original content when the receiver has the mask, the encrypted masked content, and the knowledge of how to reverse the masking operation. The receiver then renders either the content or masked content for perception by a user.

Figure 9:
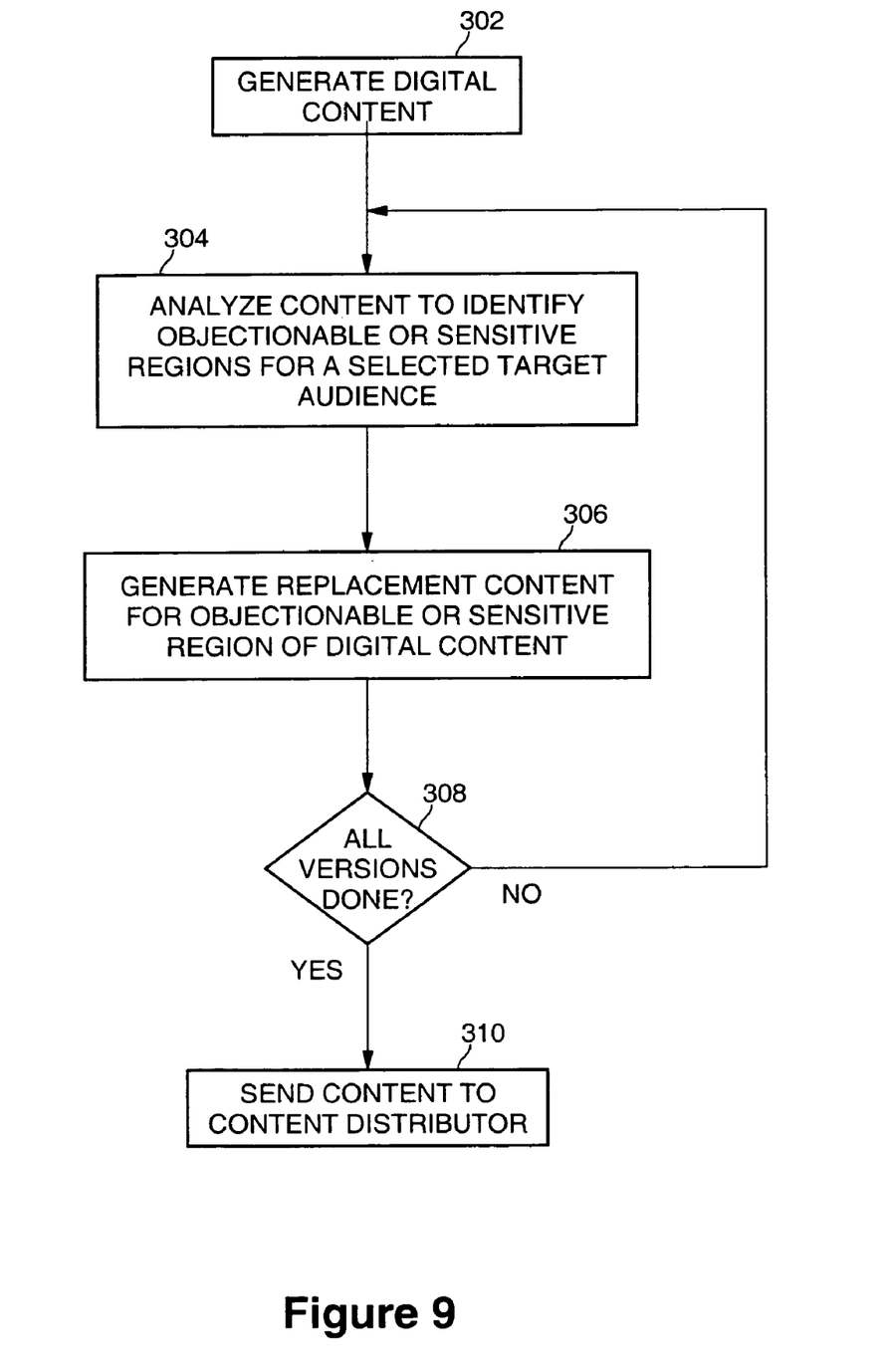
FIG. 9 is a flow diagram of processing by a content creator according to an embodiment of the present invention.

FIG. 9 is a flow diagram of processing by a content creator according to an embodiment of the present invention. In some embodiments, the content creator may perform the functions of the content generator and content censor shown in FIG. 8. At block 300, the digital content may be generated. Next, the content creator analyzes the content to identify objectionable or sensitive regions for a selected target audience at block 304. At block 306, the content creator generates replacement content for the objectionable or sensitive regions of the digital content. At block 308, if all desired versions of the content have not been generated, processing may continue with block 304 again. In this way, multiple versions of content may be produced, each version having the same or different regions being edited or masked and replaced with other content. If all versions have been produced at block 308, then the content may be sent to a content distributor at block 310 for subsequent distribution to end-users.

Figure 10:
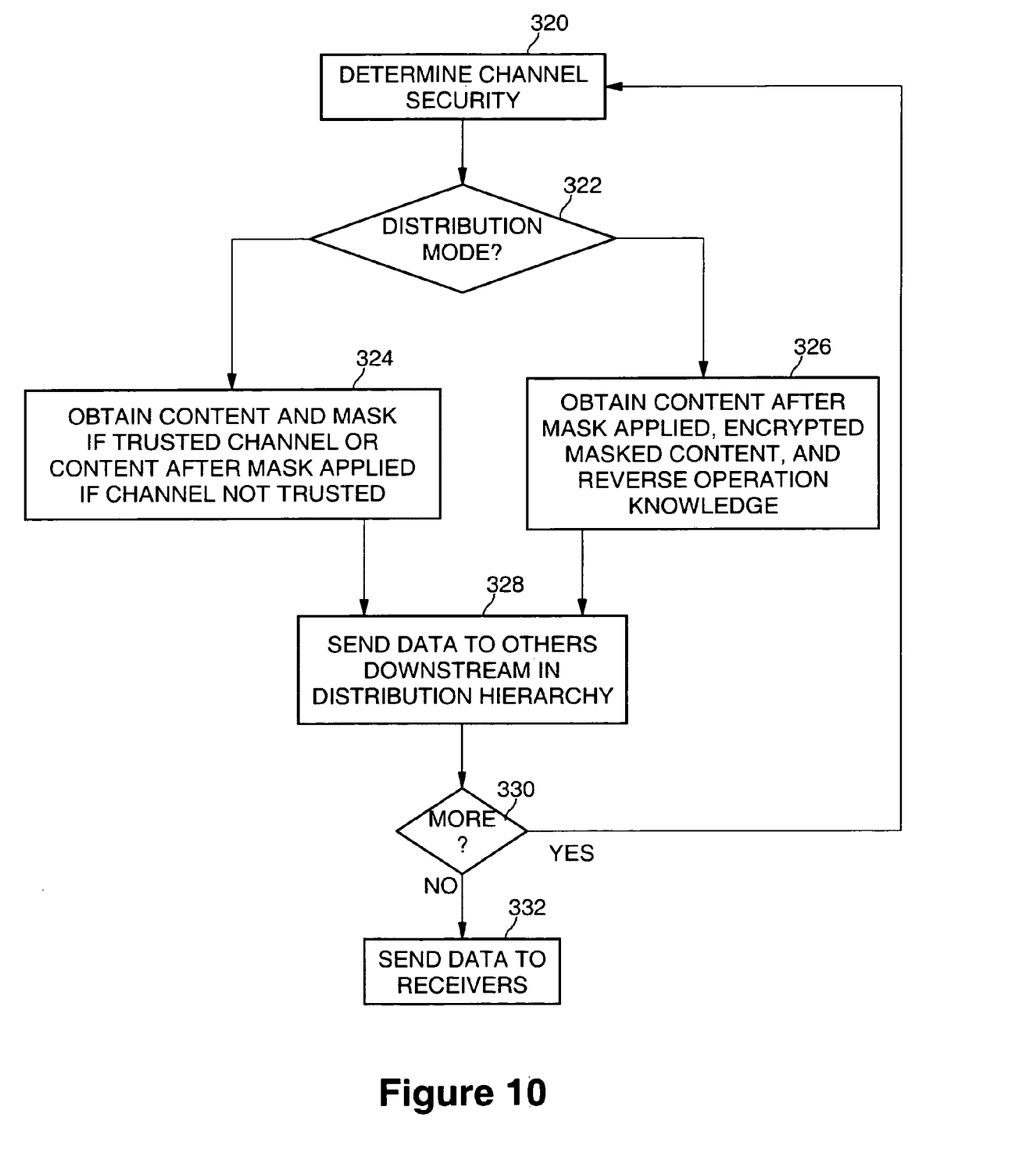
FIG. 10 is a flow diagram of processing by a distributor according to an embodiment of the present invention.

FIG. 10 is a flow diagram of processing by a distributor in a content distribution hierarchy according to an embodiment of the present invention. At block 320, the distributor determines the security level of the distribution channel. The distributor then selects which distribution mode to use depending on whether the channel and the receiver may be trusted. If the distribution mode at block 322 is determined to be the first mode as shown in FIG. 6, then the distributor obtains the content and mask, if the channel is trusted, or the CAMA data, if the channel is not trusted, at block 324. This data may be obtained from an entity upstream from this distributor in the content distribution hierarchy, such as another distributor or a content creator. Otherwise, the second distribution mode as shown in FIG. 7 may be used. At block 326, the distributor obtains the CAMA data, the encrypted masked content, and optionally the reverse masking operation knowledge. This data may be obtained from an upstream distributor or content creator. In either case, at block 328, the distributor may send the data to other distributors downstream in the distribution hierarchy. If more distribution is required at block 330, processing continues with the next level of the distribution hierarchy at block 320. Otherwise, the distributor is the lowest distribution level of the content distribution hierarchy and processing continues at block 332 by sending the data to one or more receivers.

Figure 11:
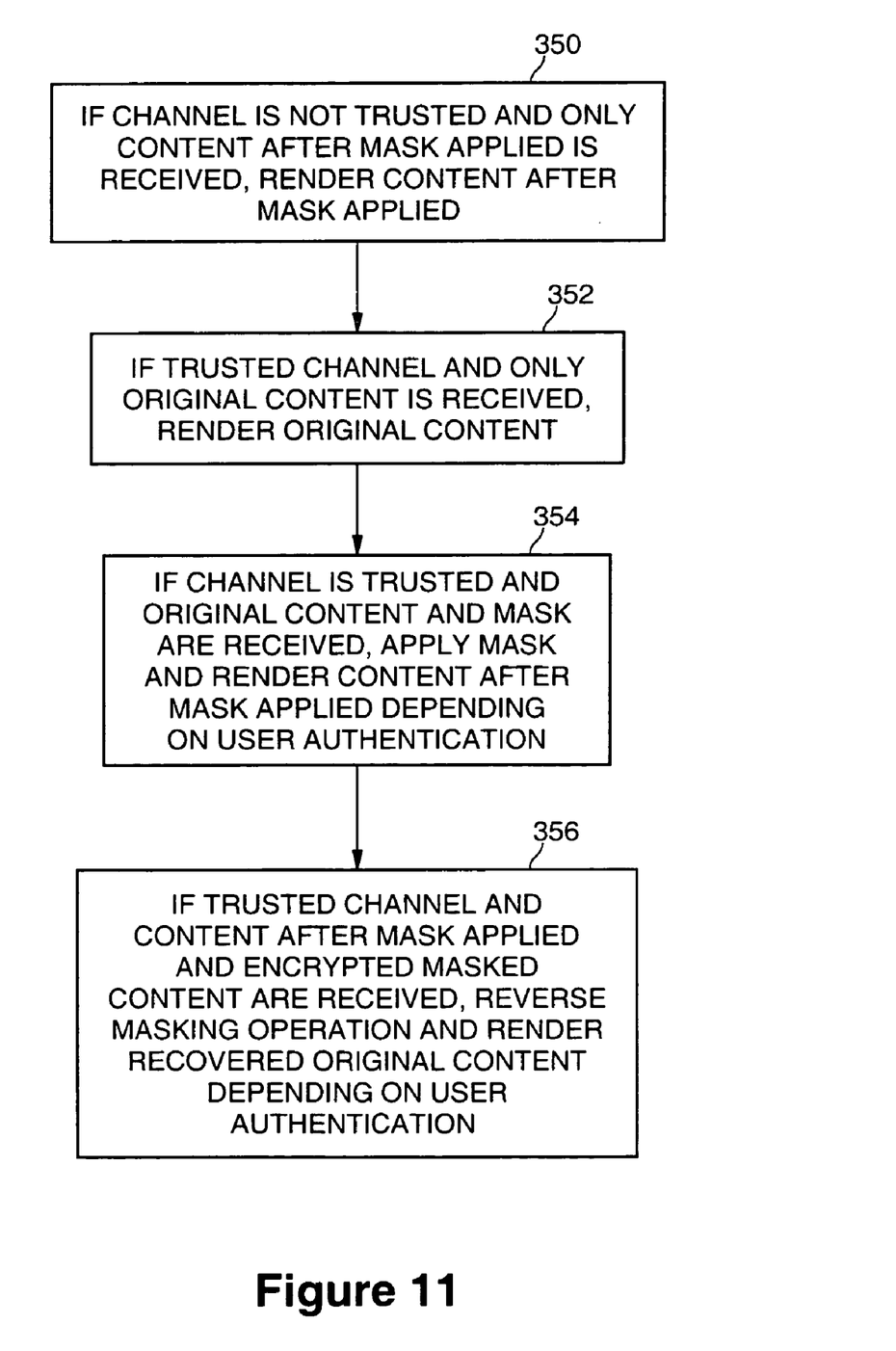
FIG. 11 is a flow diagram of processing by a receiver according to an embodiment of the present invention.

FIG. 11 is a flow diagram of processing of a receiver according to an embodiment of the present invention. At block 350, if the distribution channel is not trusted and only CAMA data is received, then the receiver renders the CAMA data for perception by the user. At block 352, if the channel is trusted and only original content is received, then the receiver renders the original content for perception by the user. At block 354, if the channel is trusted and original content and an associated mask are received, then the receiver applies the mask to the content to produce CAMA data and renders this data for perception by the user. Performance of these actions may depend on authentication of the user operating the receiver. At block 356, if the channel is trusted and CAMA data and the encrypted masked content are received, then the receiver may reverse the masking operation and render the recovered original content for perception by the user. Performance of the reverse operation and rendering may depend on authentication of the user operating the receiver.

Typical existing conditional access systems require content to be obfuscated at the source of the content (e.g., the broadcaster or content creator). With embodiments of the present invention, portions of content may be obfuscated at any level of a content distribution hierarchy. This allows each intermediate distributor to decide whether obfuscation will be performed and to describe how the obfuscation will be performed. This feature is made possible with the present invention because both the content and the masks are in digital form and can be manipulated losslessly, and because the masks may be coupled to the digital content via software links or pointers. Thus, the present invention allows distributors to determine whether customers are authorized to receive original, unedited content or whether the customers should receive edited content. For example, a distributor may in effect broadcast multiple versions of a movie with ratings NC-17, R and PG-13 over the digital content distribution system to trusted receivers. Different masks may be transmitted along with the original content. The masks may be in conformance with the Motion Picture of America Association (MPAA) movie rating system. Depending on the characteristics of the receiver and the authenticated identity of the user, the receiver may apply different masks to the original content to produce selected ones of the different versions.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the portions of the present invention includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 12:
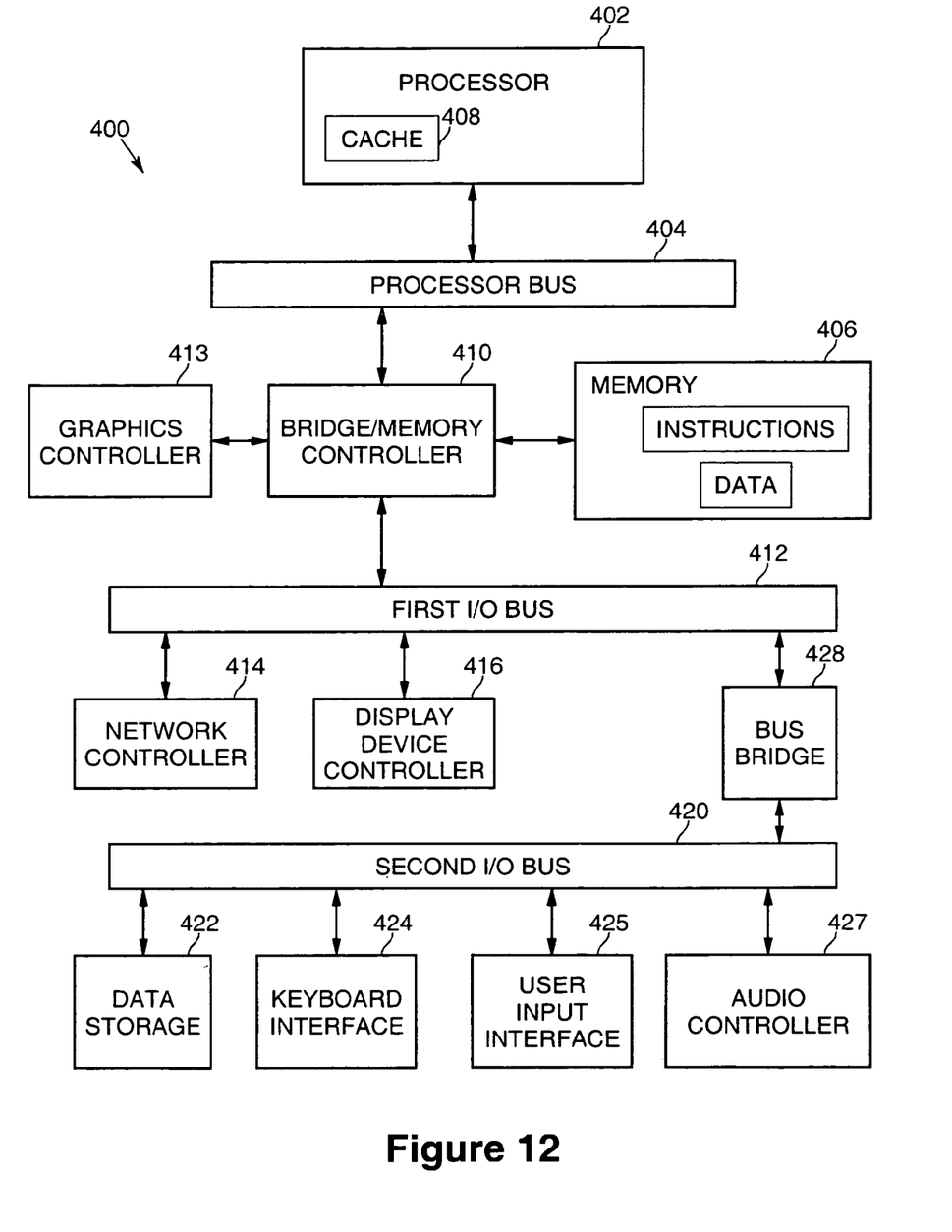
FIG. 12 is a diagram of a system which may be used to implement one or more of the components of the content distribution system according to an embodiment of the present invention.

An example of one such type of processing system is shown in FIG. 12, however, other systems may also be used and not all components of the system shown are required for the present invention. Sample system 400 may be used, for example, to execute the processing for embodiments of components of the content distribution system, in accordance with the present invention, such as the embodiment described herein. Sample system 400 is representative of processing systems based on the PENTIUM®II, PENTIUM® $\mu$l, and CELERON™ microprocessors available from Intel Corporation, although other systems (including personal computers (PCs) having other microprocessors, engineering workstations, other set-top boxes, and the like) and architectures may also be used.

FIG. 12 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the system. An audio controller 427 may be coupled to the second I/O bus for handling processing of audio signals through one or more loudspeakers (not shown). A bus bridge 428 couples first I/O bridge 412 to second I/O bridge 420.

Embodiments of the present invention are related to the use of the system 400 as a component in a content distribution system, such as a content generator, content censor, distributor, or receiver. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute content masking and distribution processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 (e.g., a DVD) may be used to provide long-term storage for the executable instructions and data structures for embodiments of components of the content distribution system in accordance with the present invention, whereas memory 406 is used to store on a shorter term basis the executable instructions of embodiments of components of the content distribution system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of content level filtering and distribution of digital content in a content distribution system comprising:
  obtaining, by a content provider in the content distribution system, the digital content and a mask for obfuscating a selected portion of the digital content;
  determining, by a content provider in the content distribution system, If a receiver of the digital content is trusted;

sending the digital content to the receiver for subsequent rendering when the receiver is trusted; and applying the mask to the digital content to generate content after mask applied data by the content provider prior to distributing the content after mask applied data to the receiver, and sending the content after mask applied data to the receiver for subsequent rendering of the content after mask applied data when the receiver is not trusted.

2. The method of claim 1, wherein the digital content comprises video data and the mask comprises a replacement two dimensional region for a selected portion of one or more frames of video data.

3. The method of claim 1, wherein the digital content comprises audio data and the mask comprises a replacement audio clip for a selected portion of the digital content.

4. The method of claim 1, wherein the digital content comprises three dimensional volume data and the mask comprises a replacement three dimensional region for a selected portion of the digital content.

5. The method of claim 1, wherein application of the mask results in replacement of a selected portion of the digital content with a replacement creative component.

6. An article comprising: a storage medium having a plurality of machine readable instructions, wherein when the instructions are executed by a processor, the instructions provide content level filtering and distribution of digital content in a content distribution system by:

obtaining, by a content provider in the content distribution system, the digital content and a mask for obfuscating a selected portion of the digital content;

determining, by a content provider in the content distribution system, if a receiver of the digital content is trusted;

sending the digital content to the receiver for subsequent rendering when the receiver is trusted; and applying the mask to the digital content to generate content after mask applied data by the content provider prior to distributing the content after mask applied data to the receiver, and sending the content after mask applied data to the receiver for subsequent rendering of the content after mask applied data when the receiver is not trusted.

7. The article of claim 6, wherein the digital content comprises video data and the mask comprises a replacement two dimensional region for a selected portion of one or more frames of video data.

8. The article of claim 6, wherein the digital content comprises audio data and the mask comprises a replacement audio clip for a selected portion of the digital content.

9. The article of claim 6, wherein the digital content comprises three dimensional volume data and the mask comprises a replacement three dimensional region for a selected portion of the digital content.

10. The article of claim 6, wherein application of the mask results in replacement of a selected portion of the digital content with a replacement creative component.

11. A system providing content level filtering and distribution of digital content comprising:

a content provider including a content censor to identify regions of content to obfuscate; and a mask generator to accept the content and regions and produce a mask to apply to the content to obfuscate the identified regions; wherein the mask generator links the content with the regions, generates a mask, applies the mask to the content to produce content after mask applied data and masked content, and encrypts the masked content, and a distributor to transmit the content after mask applied data to a receiver.

12. The system of claim 11, wherein the receiver comprises a decryptor to decrypt the encrypted masked content and a de-masker to reverse masking of the content after mask applied data to reproduce original content for rendering by the receiver.

* * * * *